US010784760B2

(12) United States Patent
Hsu et al.

(10) Patent No.: US 10,784,760 B2
(45) Date of Patent: Sep. 22, 2020

(54) CORE-TYPE LINEAR MOTOR

(71) Applicant: CHIEFTEK PRECISION CO., LTD., Tainan (TW)

(72) Inventors: Ming-Che Hsu, Tainan (TW); Hsuan-Chun Wu, Tainan (TW); Hsun-Han Liu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 382 days.

(21) Appl. No.: 15/386,163

(22) Filed: Dec. 21, 2016

(65) Prior Publication Data

US 2018/0175715 A1 Jun. 21, 2018

(51) Int. Cl.
*H02K 41/03* (2006.01)

(52) U.S. Cl.
CPC ....... *H02K 41/031* (2013.01); *H02K 2213/03* (2013.01)

(58) Field of Classification Search
CPC .................... H02K 41/031; H02K 2213/03
See application file for complete search history.

(56) References Cited

U.S. PATENT DOCUMENTS

| 2008/0265690 A1* | 10/2008 | Sasaki | H02K 41/03 310/12.24 |
| 2010/0225179 A1* | 9/2010 | Wang | H02K 41/031 310/12.26 |
| 2013/0076159 A1* | 3/2013 | Chung | H02K 21/16 310/12.18 |
| 2013/0249324 A1* | 9/2013 | Gandhi | H02K 41/033 310/12.18 |
| 2014/0054979 A1* | 2/2014 | Sugita | H02K 9/20 310/12.29 |
| 2015/0035388 A1* | 2/2015 | Mita | H02K 41/031 310/12.18 |
| 2015/0061416 A1* | 3/2015 | Kainuma | H02K 9/20 310/12.18 |
| 2018/0297105 A1* | 10/2018 | Otto | H02K 41/031 |

FOREIGN PATENT DOCUMENTS

| JP | 2010045872 A | * | 2/2010 | |
| WO | WO-2018102561 A1 | * | 6/2018 | .......... H02K 41/031 |

* cited by examiner

*Primary Examiner* — Thienvu V Tran
*Assistant Examiner* — Bart Iliya
(74) *Attorney, Agent, or Firm* — Rosenberg, Klein & Lee

(57) ABSTRACT

A core-type linear motor includes: a stator extending in an axial direction, with magnets arranged at intervals in the axial direction, wherein each magnet and its spacing from an adjacent magnet constitute a magnet unit; and a rotor opposite the stator and linearly movable in the axial direction, with coil assemblies arranged side by side in the axial direction. Each coil assembly includes a core with an active portion wound with a coil and a supporting portion. Three coil assemblies have substantially the same length in the axial direction as four magnet units. When the length of each magnet unit is defined as 1, the length of each active portion is 0.3 to 0.5, and the height of each supporting portion, 0.28 to 0.38. These size ratios help increase the motor constant, lower the cogging force, and reduce positive attraction between the rotor and the stator.

6 Claims, 9 Drawing Sheets

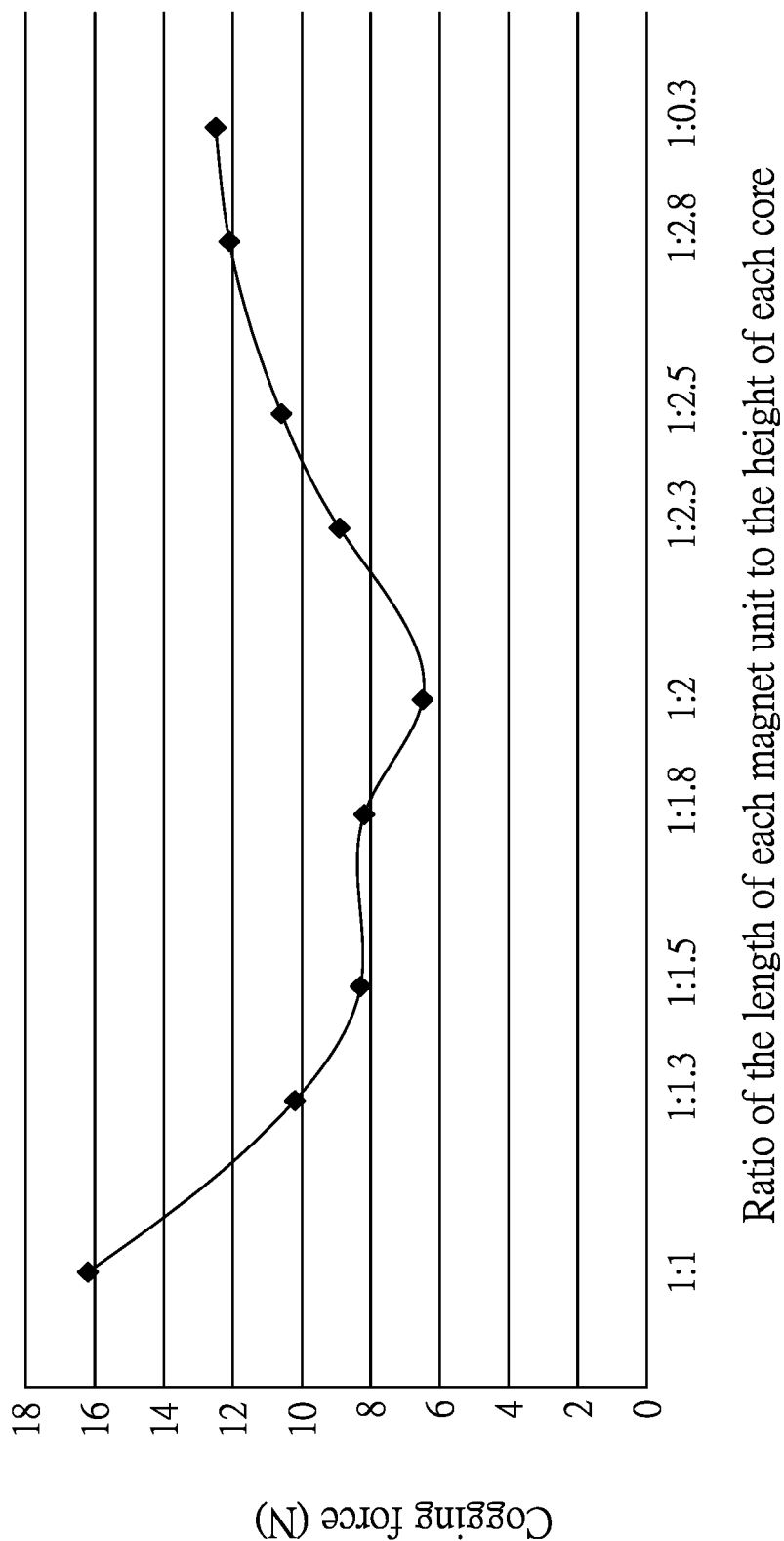
F I G . 6

CORE-TYPE LINEAR MOTOR

BACKGROUND OF THE INVENTION

1. Technical Field

The present invention relates to a core-type linear motor and more particularly to a linear motor with a particular length ratio between the core width of the coil assemblies of the rotor and the magnet width of the stator in order to achieve a high motor constant, a small cogging force, and low positive attraction.

2. Description of Related Art

Referring to FIG. 8, a core-type linear motor is composed of a stator A and a rotor B. The stator A extends in an axial direction and includes a backplate A1 and a plurality of magnets A2. The magnets A2 are arranged on the backplate A1 in a spaced manner along the axial direction. Each magnet A2 and its spacing d from an adjacent magnet A2 constitute a magnet unit U. The rotor B is provided opposite the stator A and is configured to move linearly in the axial direction. The rotor B includes a plurality of coil assemblies B1 arranged side by side in the axial direction. Each coil assembly B1 includes a core B11 and a coil B12 wound around the core B11. In a UVW three-phase motor, the length of three coil assemblies B1 in the axial direction is approximately equal to that of four to seven magnet units U.

Referring to FIG. 3 for a plot showing motor constants in relation to different ratios between the coil assemblies B1 and the magnet units U, the highest motor constants are achieved when three coil assemblies B1 correspond in length to four magnet units U.

Referring to FIG. 9, the rotor B is used to drive a carrier C. The carrier C and the rotor B form a linear moving assembly together with the two linear slide rails D that support the two lateral sides of the carrier C respectively. A piece of working equipment E can be locked to the carrier C in order to be moved back and forth linearly.

Referring to FIG. 4 for a plot showing attractive force-to-thrust force ratios in relation to different ratios between the coil assemblies B1 and the magnet units U, the highest ratios of attractive force to thrust force between the rotor B and the stator A take place when three coil assemblies B1 correspond in length to five or seven magnet units U. The higher this attraction-to-thrust ratio, the greater the load on the linear slide rails D while the mechanism is in reciprocating movement, and the more likely it is that the service life of the linear slide rails D would be shortened. The lowest attraction-to-thrust ratios are achieved when three coil assemblies B1 correspond in length to four magnet units U.

BRIEF SUMMARY OF THE INVENTION

Based on the arrangement of three coil assemblies corresponding in length to four magnet units, the present invention makes further improvement on the size relationship between coil assemblies and magnet units in order to obtain a higher motor constant and a lower attractive force-to-thrust force ratio.

The present invention provides a core-type linear motor that includes a stator and a rotor of the following configurations:

The stator extends in an axial direction and includes a backplate and a plurality of magnets. The magnets are arranged on the backplate in a spaced manner in the axial direction. Each magnet and its spacing from an adjacent magnet constitute a magnet unit. The rotor is provided opposite the stator and is configured to move linearly in the axial direction. The rotor includes a plurality of coil assemblies arranged side by side in the axial direction. Each coil assembly includes a core and a coil wound around the core. The length of three coil assemblies in the axial direction is substantially equal to the length of four magnet units in the axial direction.

Furthermore, each core has an active portion and a supporting portion connected to the active portion, wherein the active portion is wound with the corresponding coil. When the length of each magnet unit is defined as 1, the length of each active portion ranges from 0.3 to 0.5 and is preferably 0.4.

Furthermore, each core has an active portion and a supporting portion connected to the active portion, wherein the active portion is wound with the corresponding coil. When the length of each magnet unit is defined as 1, the height of each supporting portion ranges from 0.28 to 0.38 and is preferably 0.33.

Furthermore, when the length of each magnet unit is defined as 1, the length of each spacing ranges from 0.24 to 0.28 and is preferably 0.26.

Furthermore, when the length of each magnet unit is defined as 1, the height of the core of each coil assembly in a direction perpendicular to the axial direction ranges from 1.8 to 2.3 and is preferably 2.

The present invention has the following advantageous effects:

1. A core-type linear motor is provided with a relatively high motor constant when the magnet units of its stator and the coil assemblies of its rotor are configured according to the size ratios of the present invention.

2. Once the magnet units of the stator and the coil assemblies of the rotor are configured according to the size ratios of the present invention, positive attraction between the rotor and the stator will be lowered, thereby reducing the load on, and hence extending the service life of, the linear slide rails that serve as a support.

BRIEF DESCRIPTION OF THE SEVERAL VIEWS OF THE DRAWINGS

FIG. 6 is a plot based on an embodiment of the present invention, showing cogging forces in relation to different ratios between the length of each magnet unit and the height of each core;

DETAILED DESCRIPTION OF THE INVENTION

The present invention incorporates the foregoing technical features into a core-type linear motor, whose major effects are detailed below with reference to an embodiment of the invention.

Figure 1:
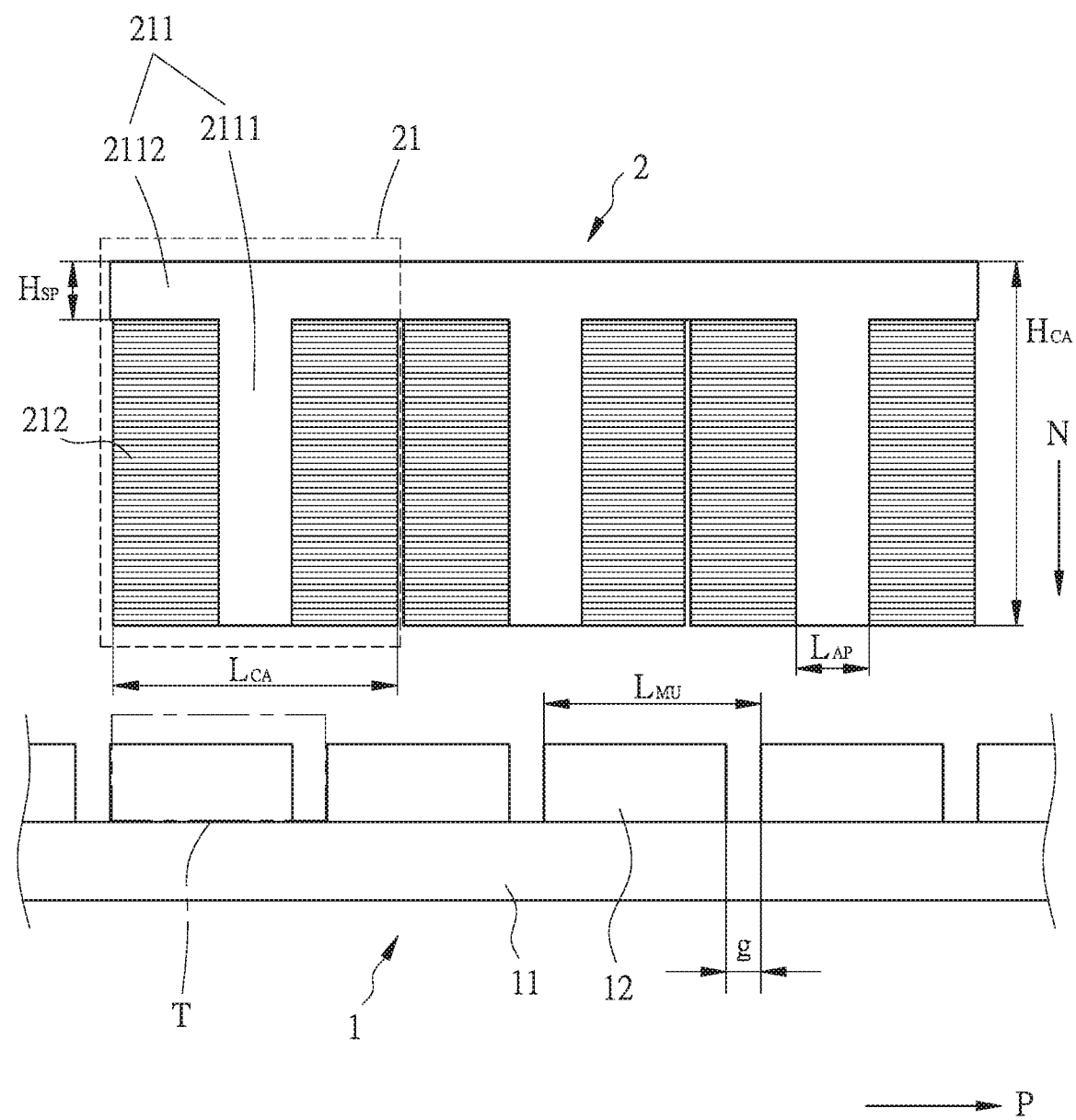
FIG. 1 is a schematic drawing of a core-type linear motor according to the present invention, showing the length ratio between the coil assemblies of the rotor and the magnet units of the stator in the axial direction.

Referring to FIG. 1, the core-type linear motor in an embodiment of the present invention includes a stator 1 and a rotor 2.

The stator 1 extends in an axial direction P and includes a backplate 11 and a plurality of magnets 12. The magnets 12 are arranged on the backplate 11 and are spaced from one another in the axial direction. Each magnet 12 and its spacing g from an adjacent magnet 12 constitute a magnet unit T. The rotor 2 is provided opposite the stator 1 and is configured to move linearly in the axial direction. The rotor 2 includes a plurality of coil assemblies 21 arranged side by side in the axial direction. Each coil assembly 21 includes a core 211 and a coil 212. Each core 211 has an active portion 2111 wound with the corresponding coil 212 and a supporting portion 2112 connected to the active portion 2111. In this embodiment, which is implemented as a UVW three-phase motor by way of example, the supporting portions 2112 of the cores 211 of the three coil assemblies 21 can be viewed as a single unit. It should be particularly pointed out that, in this embodiment, the length of the three coil assemblies 21 in the axial direction is substantially equal to the length of four magnet units T in the same direction. For convenience of reference, in FIG. 1, the length of a magnet unit T in the axial direction P is labeled $L_{MU}$, the length of a spacing between magnet units T in the axial direction P is labeled g, the length of a coil assembly 21 in the axial direction P is labeled $L_{CA}$, the length of an active portion 2111 of a core 211 in the axial direction P is labeled $L_{AP}$, the height of a core 211 transverse to the axial direction P is labeled $H_{CA}$, and the height of a supporting portion 2112 of a core 211 transverse to the axial direction P is labeled $H_{SP}$.

Figure 2:
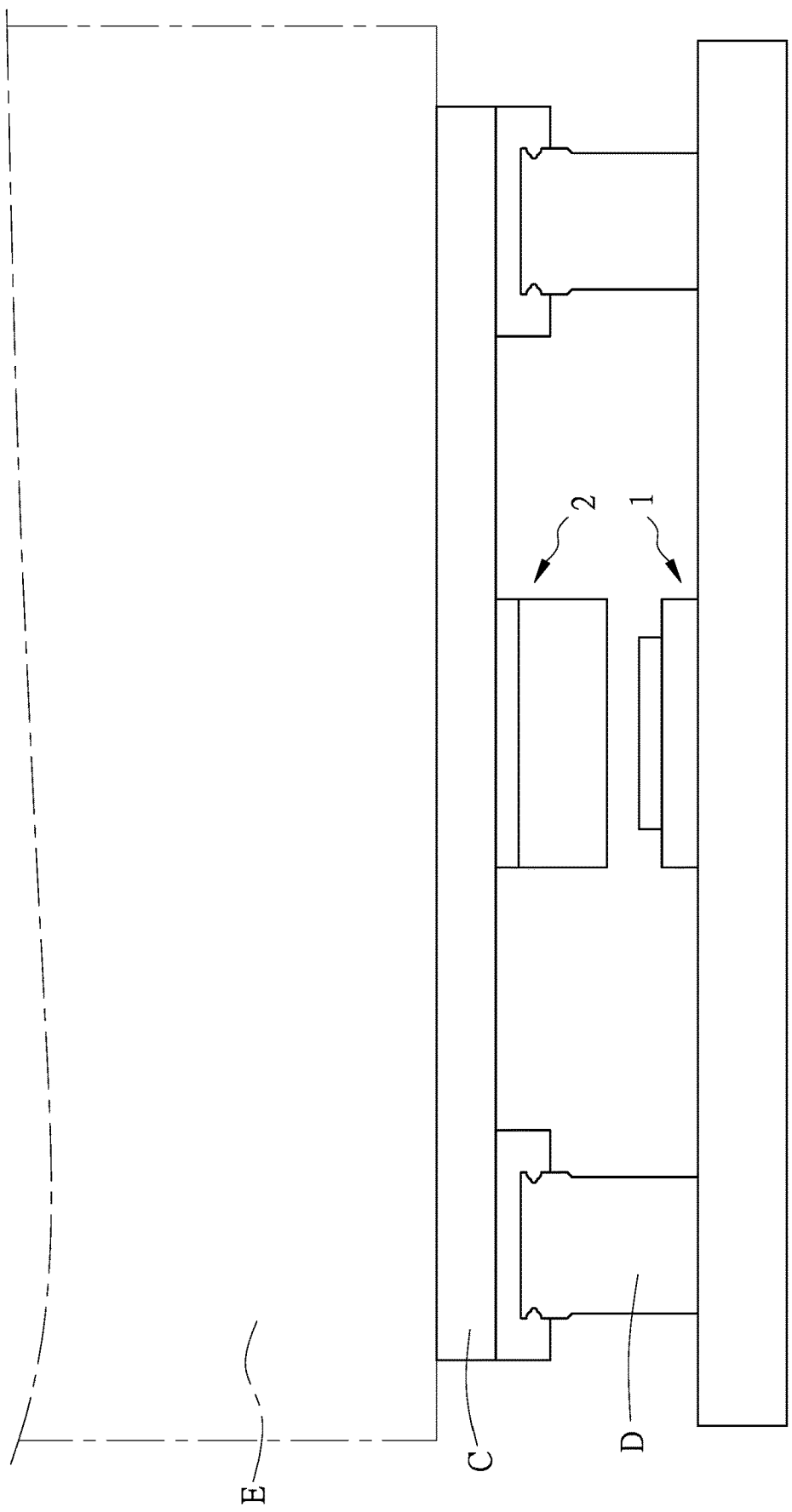
FIG. 2 schematically shows the structure of the linear moving assembly in an embodiment of the present invention.

Referring to FIG. 2, a carrier C is locked to the supporting portions 2112 of the cores 211 of the rotor 2 in order to be driven by the rotor 2. Each of the left and right sides of the carrier C is supported by a linear slide rail D such that the rotor 2, the carrier C, and the linear slide rails D jointly form a linear moving assembly. A piece of working equipment E can be locked to the carrier C so as to be moved back and forth linearly.

Figure 3:
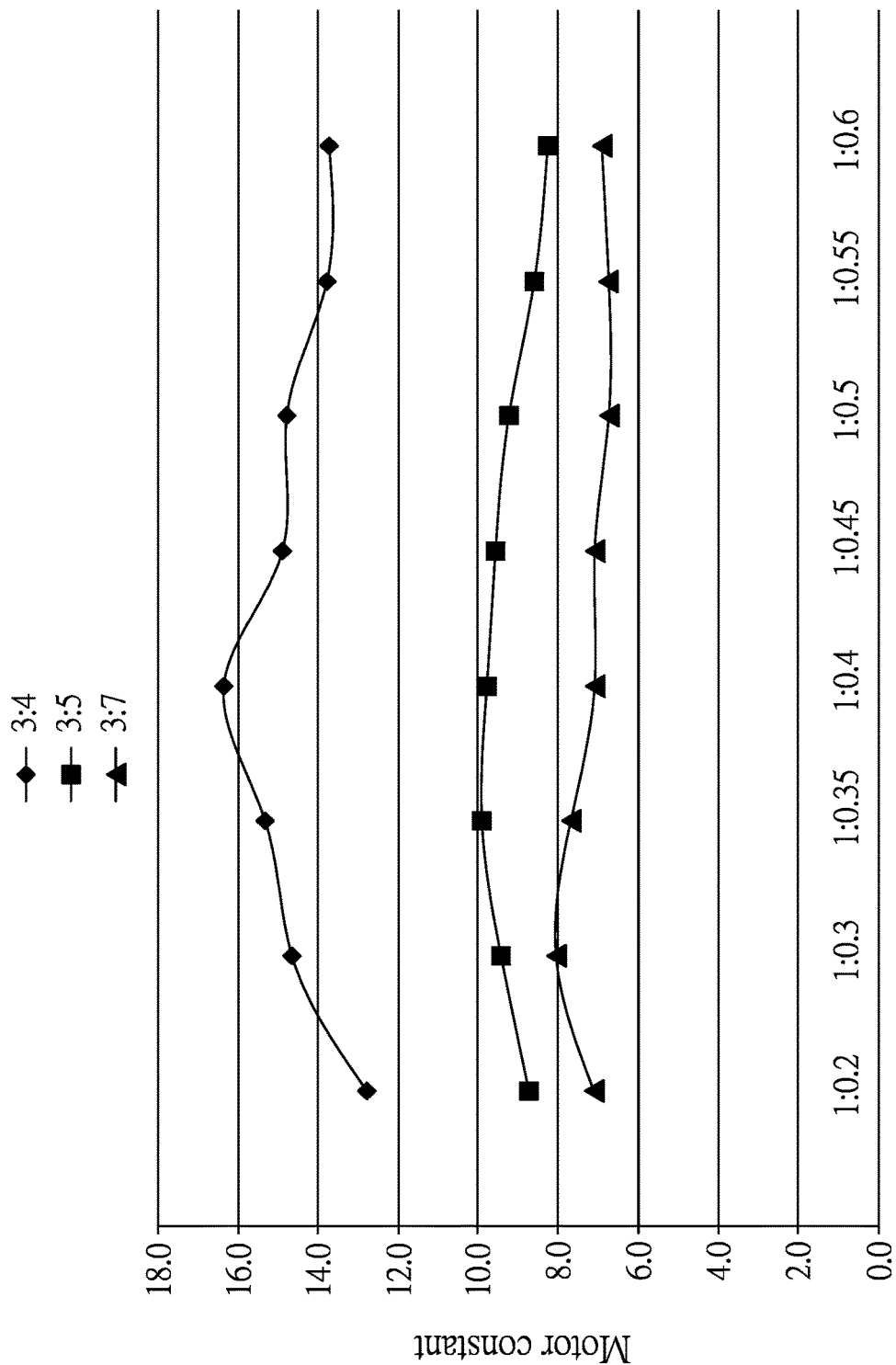
FIG. 3 is a plot based on an embodiment of the present invention, showing motor constants in relation to different length ratios between the coil assemblies of the rotor and the magnet units of the stator in the axial direction.
Figure 7:
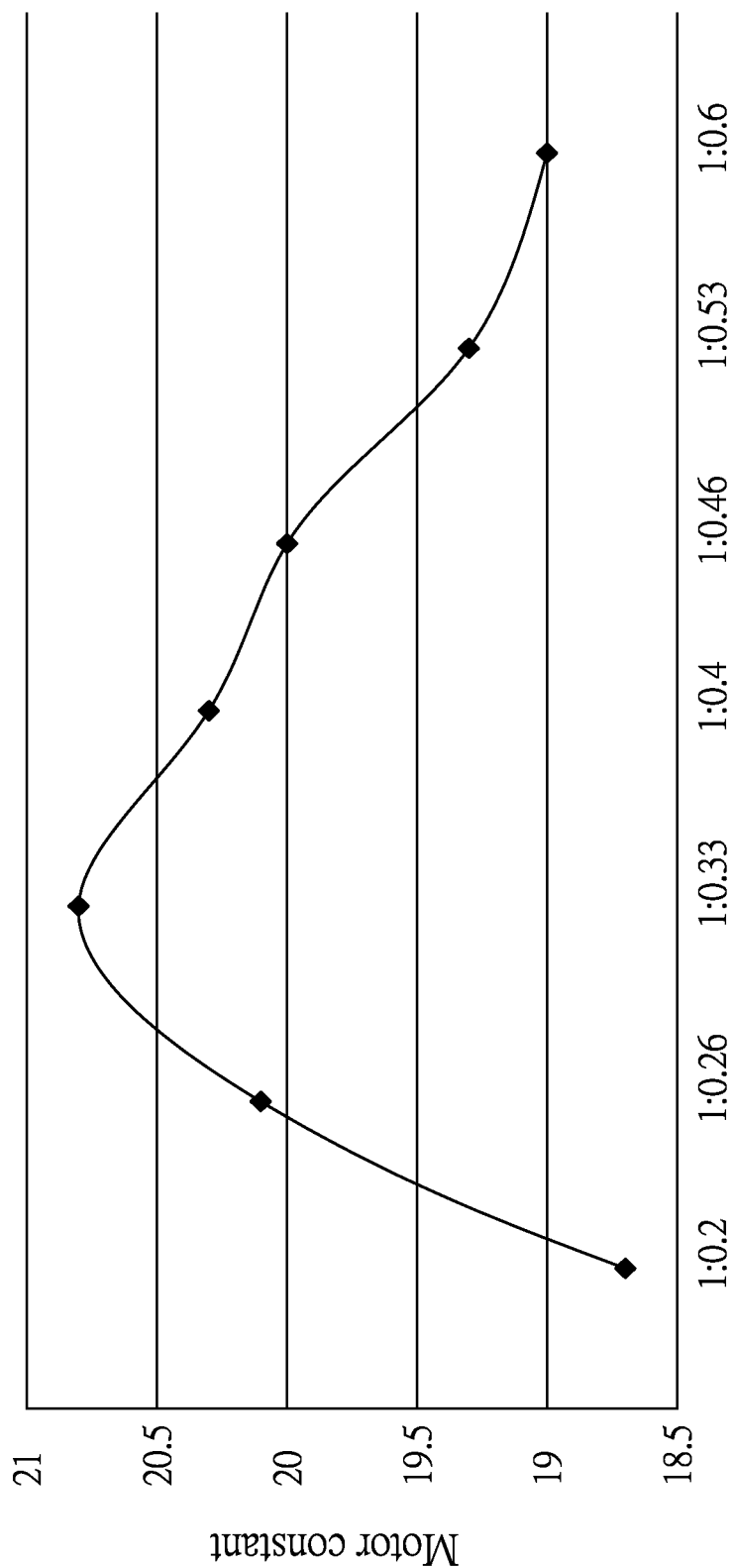
FIG. 7 is a plot based on an embodiment of the present invention, showing motor constants in relation to different ratios between the length of each magnet unit and the height of the supporting portion of each core.
Figure 8:
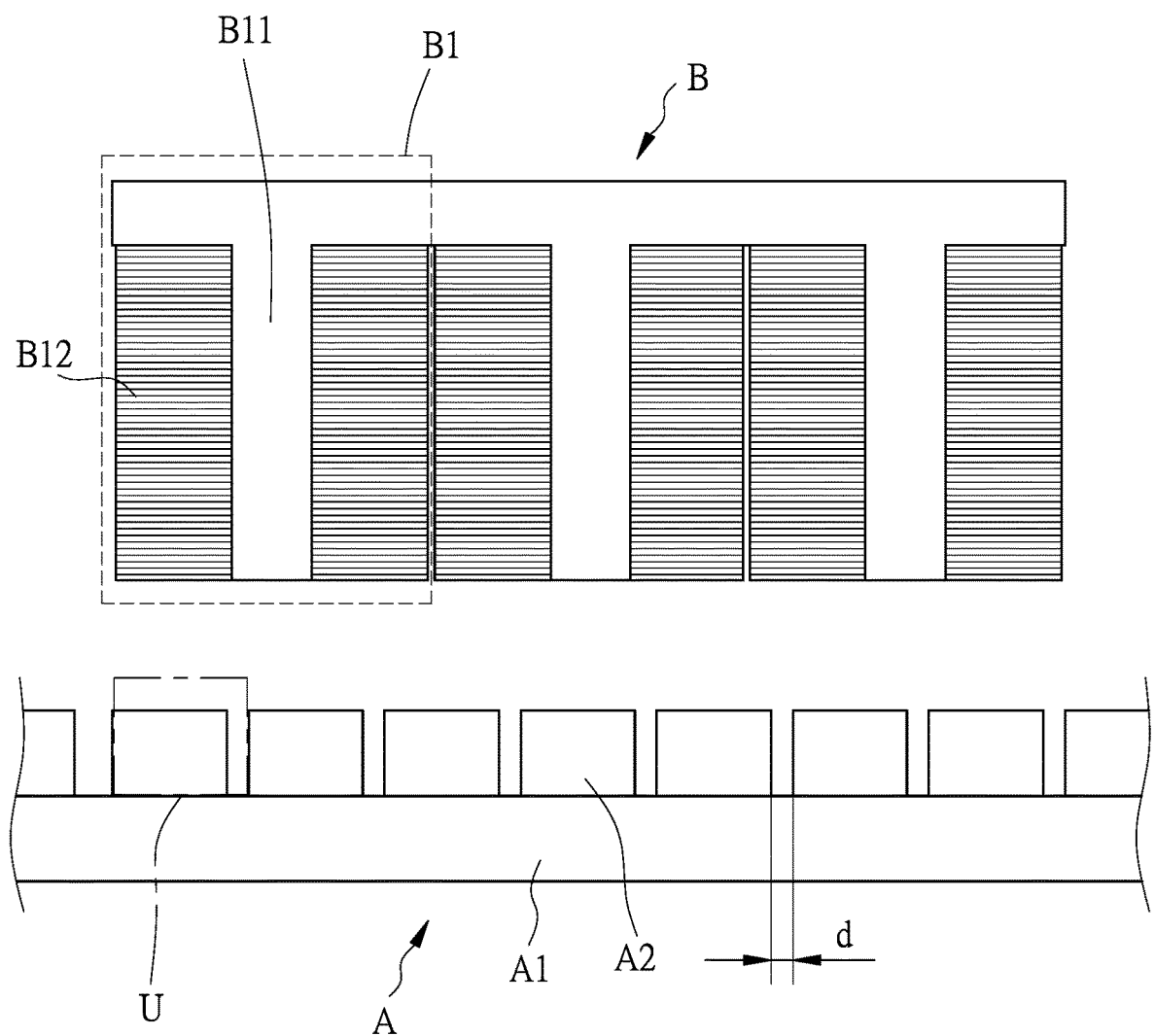
FIG. 8 is a schematic drawing of a conventional core-type linear motor, showing the length ratio between the coil assemblies of the rotor and the magnet units of the stator in the axial direction.
Figure 9:
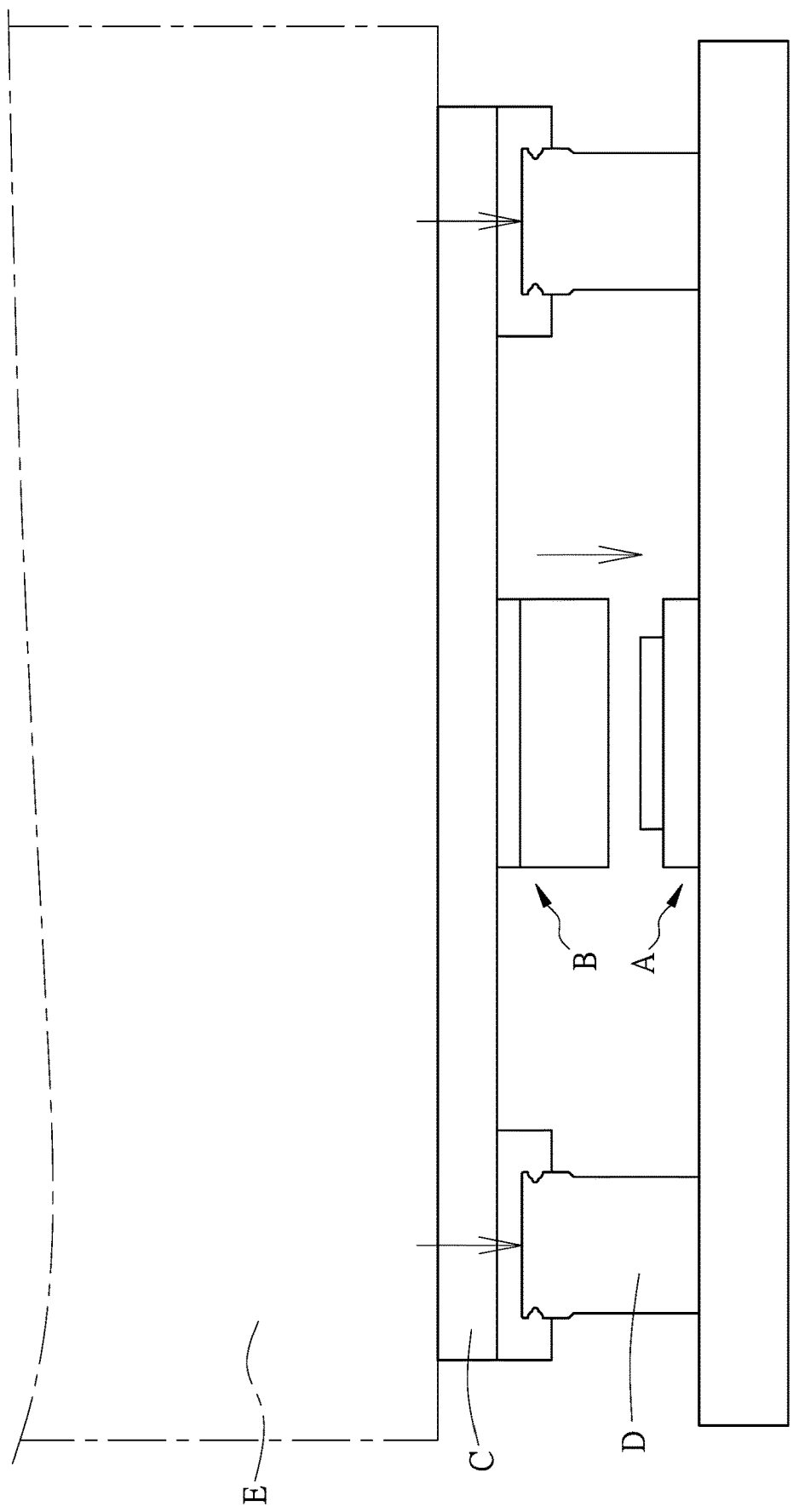
FIG. 9 schematically shows the structure of the linear moving assembly in a conventional core-type linear motor.

Referring to FIG. 3 in conjunction with FIG. 1 and FIG. 2, tests and length measurement in the axial direction P show that higher motor constants are achieved when the ratio of the number of coil assemblies 21 to the number of magnet units T (which is equivalent to the ratio of the lengths $L_{MU}$ to $L_{CA}$ is 3:4 than when the ratio is 3:5 or 3:7. In the plot of FIG. 3, the horizontal axis represents the length ratio of each magnet unit T to the active portion 2111 of each core 211 (that is, $L_{MU}$ to $L_{AP}$). As can be seen in the plot, relatively high motor constants are obtained when the length ratio of each magnet unit T to the active portion 2111 of each core 211 ranges from 1:0.3 to 1:0.5, and the highest motor constant corresponds to the ratio of 1:0.4. In addition, referring to FIG. 7, relatively high motor constants occur when the ratio of the length of each magnet unit T to the height of the supporting portion 2112 of each core 211 (the is, $L_{MU}$ to $H_{SP}$) ranges from 1:0.28 to 1:0.38, and the highest motor constant corresponds to the ratio of 1:0.33.

Figure 4:
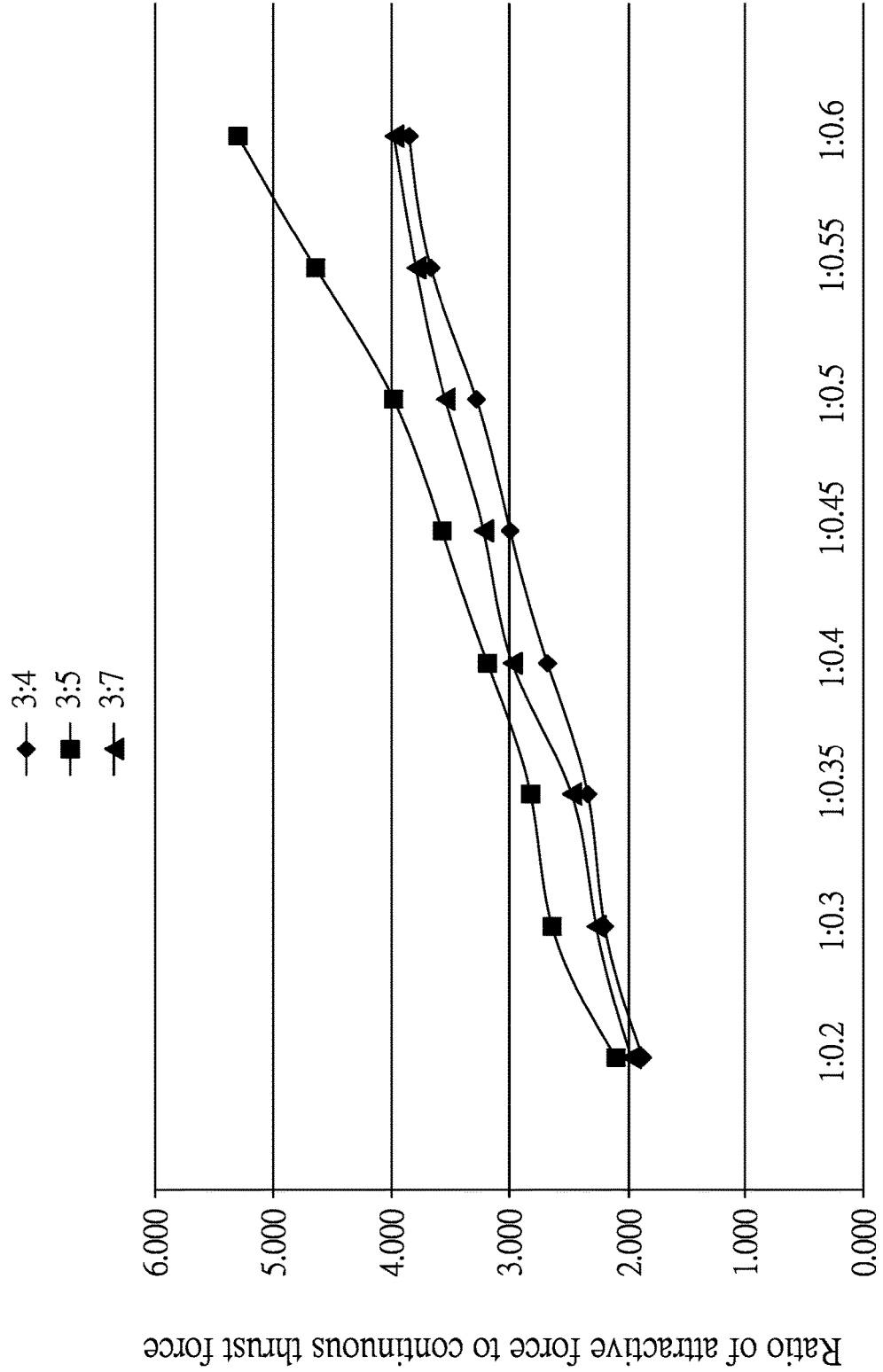
FIG. 4 is a plot based on an embodiment of the present invention, showing attractive force-to-thrust force ratios between the rotor and the stator in relation to different length ratios between the coil assemblies of the rotor and the magnet units of the stator in the axial direction.

Referring to FIG. 4 in conjunction with FIG. 1 and FIG. 2, tests and length measurement in the axial direction P show that lower ratios of attractive force to continuous thrust force are achieved when the ratio of the number of coil assemblies 21 to the number of magnet units T is 3:4 than when the ratio is 3:5 or 3:7. A relatively low attractive force-to-continuous thrust force ratio signifies a relatively low positive attractive force (N) between the rotor 2 and the stator 1 and therefore a relatively small load on the linear slide rails D while the mechanism is in operation, which helps extend the service life of the linear slide rails D.

Figure 5:
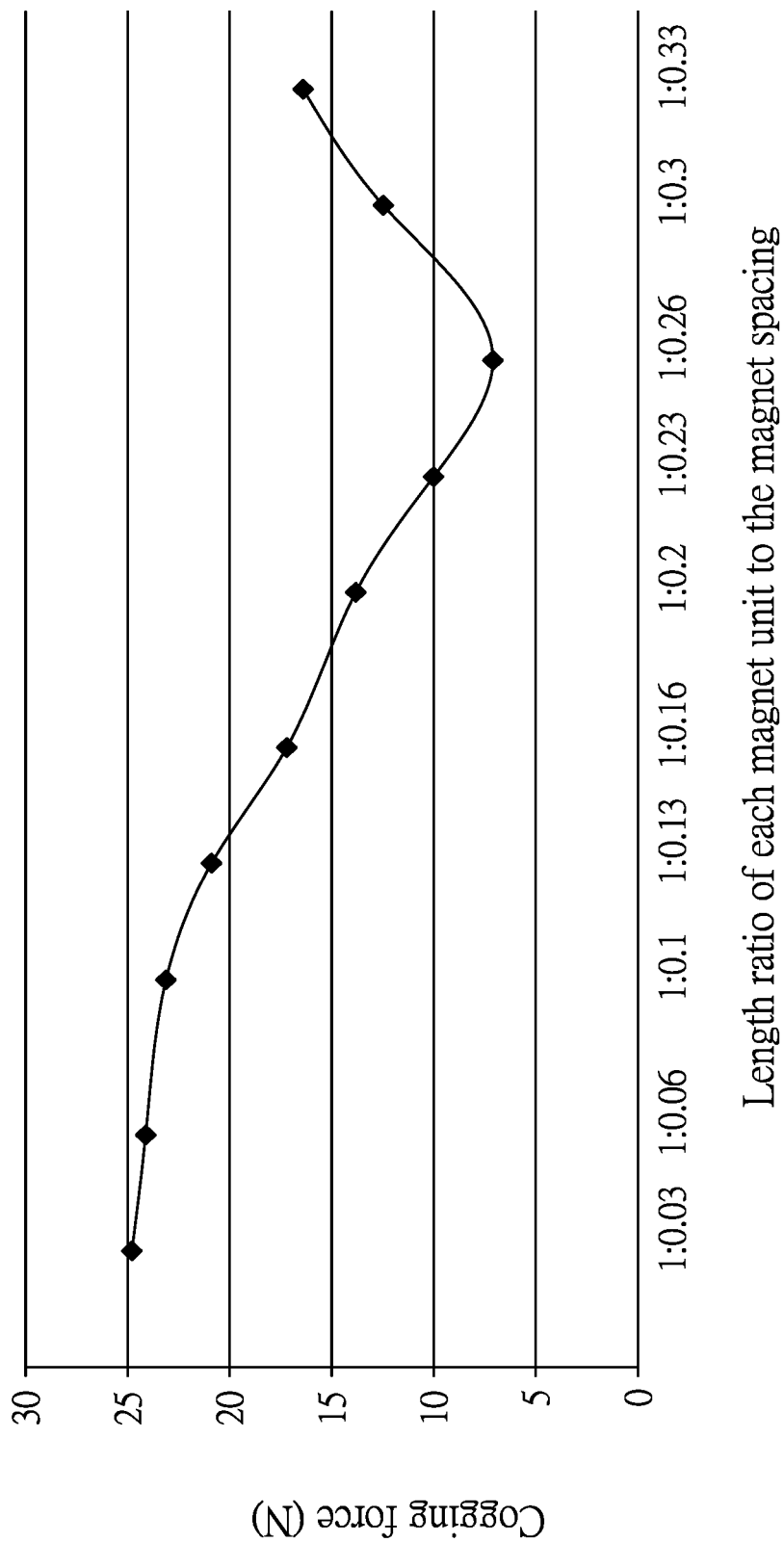
FIG. 5 is a plot based on an embodiment of the present invention, showing cogging forces in relation to different length ratios between the magnet units and their spacings.

Further tests and measurements show the following ratios (with the length of each magnet unit T in the axial direction defined as 1) for achieving a higher motor constant and a lower ratio of attractive force to continuous thrust force:

Referring to FIG. 5 in conjunction with FIG. 1, relatively small cogging forces and positive attractive forces (N) take place when the length of the magnet spacing g ranges from 0.24 to 0.28, relative to the length of each magnet unit T (that is, $L_{MU}$). The smallest cogging force and positive attractive force correspond to the length of 0.26.

Referring to FIG. 6 in conjunction with FIG. 1, relatively small cogging forces and positive attractive forces (N) also take place when the height of the core 211 of each coil assembly 21 in a direction perpendicular to the axial direction P (that is, $H_{CA}$) ranges from 1.8 to 2.3, relative to the length of each magnet unit T (that is, $L_{MU}$), and the smallest cogging force and positive attractive force correspond to the height of 2.

The foregoing description of the embodiment should be able to enable a full understanding of the operation, use, and intended effects of the present invention. The embodiment described above, however, is only a preferred one of the invention and is not intended to be restrictive of the scope of the invention. All simple equivalent changes and modifications made according to the appended claims and the disclosure of this specification should be encompassed by the present invention.

What is claimed is:

1. A core-type linear motor, comprising:
   a stator extending in an axial direction, the stator including a backplate and a plurality of magnets arranged on the backplate in a spaced manner in the axial direction, wherein each said magnet and one spacing adjacent said magnet define a magnet unit having a length $L_{MU}$ in the axial direction; and
   a rotor provided opposite the stator and configured to move linearly in the axial direction, the rotor including a plurality of coil assemblies arranged side by side in the axial direction, each said coil assembly including a core and a coil wound around the core, each said coil assembly having a length $L_{CA}$ in the axial direction;
   wherein a ratio of $L_{MU}$ to $L_{CA}$ is substantially 3:4, and
   wherein each said core forms a solid structure having a supporting portion and an active portion connected to extend transversely from the supporting portion towards the stator, each said active portion being wound with said coil corresponding thereto, each said active portion having a length $L_{AP}$ in the axial direction, a ratio of $L_{MU}$ to $L_{AP}$ ranging from 1:0.3 to 1:0.5, each said supporting portion having a transverse height $H_{SP}$, a ratio of $L_{MU}$ to $H_{SP}$ ranging from 1:0.28 to 1:0.38.

2. The core-type linear motor of claim 1, wherein the ratio of $L_{MU}$ to $L_{AP}$ is 1:0.4, and the ratio of $L_{MU}$ to $H_{SP}$ is 1:0.33.

3. The core-type linear motor of claim 1, wherein the spacing of each said magnet unit has a length g in the axial direction, the ratio of $L_{MU}$ to g ranging from 1:0.24 to 1:0.28.

4. The core-type linear motor of claim 3, wherein the ratio of $L_{MU}$ to g is 1:0.26.

5. The core-type linear motor of claim 1, wherein the core of each said coil assembly has a height $H_{CA}$ in a direction perpendicular to the axial direction, the ratio of $L_{MU}$ to $H_{CA}$ ranging from 1:1.8 to 1:2.3.

6. The core-type linear motor of claim 5, wherein the ratio of $L_{MU}$ to $H_{CA}$ is 1:2.

* * * * *